United States Patent
Jayamohan et al.

(10) Patent No.: US 8,841,995 B2
(45) Date of Patent: Sep. 23, 2014

(54) STEALTH MODE FOR INDICIA USED TO DISPLAY VEHICLE OPERATION

(75) Inventors: Vishnu Jayamohan, Nashville, TN (US); John Curl, Franklin, TN (US)

(73) Assignee: Nissan North America, Inc., Franklin, TN (US)

( * ) Notice: Subject to any disclaimer, the term of this patent is extended or adjusted under 35 U.S.C. 154(b) by 249 days.

(21) Appl. No.: 13/617,860

(22) Filed: Sep. 14, 2012

(65) Prior Publication Data

US 2014/0077942 A1 Mar. 20, 2014

(51) Int. Cl.
*G08B 21/00* (2006.01)

(52) U.S. Cl.
USPC ............... 340/438; 340/441; 362/489

(58) Field of Classification Search
CPC .. B60K 35/00; B60K 37/02; B60K 2350/203; B60K 2350/967
USPC ............ 340/438, 441, 449–462, 815.4; 362/23.01, 23.02, 471, 482, 489
See application file for complete search history.

(56) References Cited

U.S. PATENT DOCUMENTS

| | | | |
|---|---|---|---|
| 7,009,504 | B1 | 3/2006 | Banter et al. |
| 7,744,216 | B1 | 6/2010 | Uhlhorn |
| 2005/0094098 | A1 | 5/2005 | Morita et al. |
| 2010/0256855 | A1 | 10/2010 | Hardy et al. |

OTHER PUBLICATIONS

Images from Lamborghini Reventon, Model Year 2008, Available at least as early as 2008.
Images from Lexus LF-A, Model Year 2011, Available at least as early as 2011.
SAAB History, 1947-2011, Saab Night Panel / Saab Innovation, http://www.saabhistory.com/2007/11/16/saab-night-panel-saab-innovation/ on Jul. 6, 2012.

*Primary Examiner* — Jeffery Hofsass
(74) *Attorney, Agent, or Firm* — Young, Basile, Hanlon & MacFarlane, P.C.

(57) ABSTRACT

Embodiments of a system and method for controlling illumination in a vehicle passenger compartment are disclosed. In one aspect, a display system for a motor vehicle passenger compartment, comprises: at least one indicia visible to an operator of the vehicle and configured to indicate a vehicle operating condition; an indicia light configured to illuminate the indicia; a display device visible to an operator of the vehicle; and a controller, in communication with the indicia light and the display device, programmed to: operate the display system in a first mode wherein the indicia light is activated to illuminate the indicia, and in response to a first control signal indicative of a change from the first mode to a second mode, reduce illumination of the indicia by the indicia light and control the display device to output information indicative of the vehicle operating condition.

20 Claims, 8 Drawing Sheets

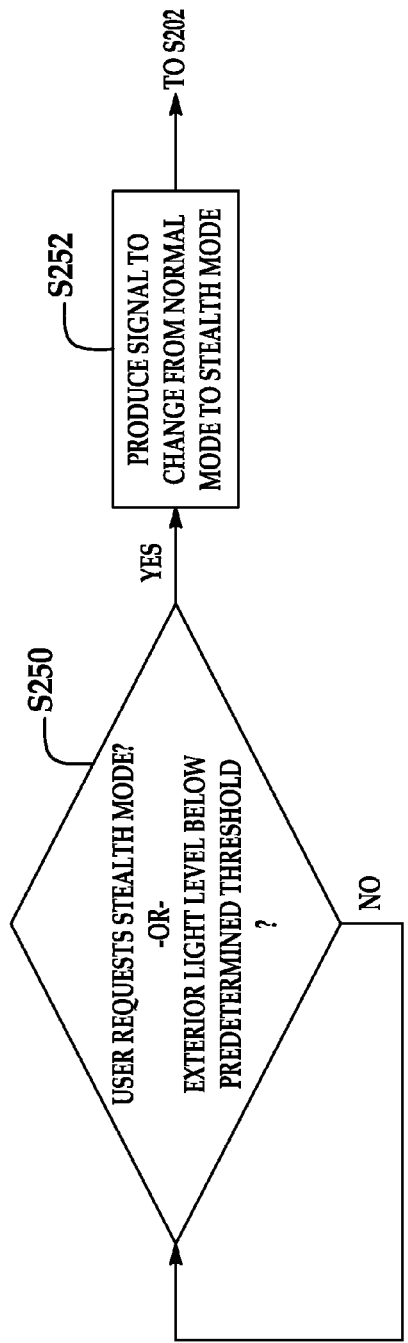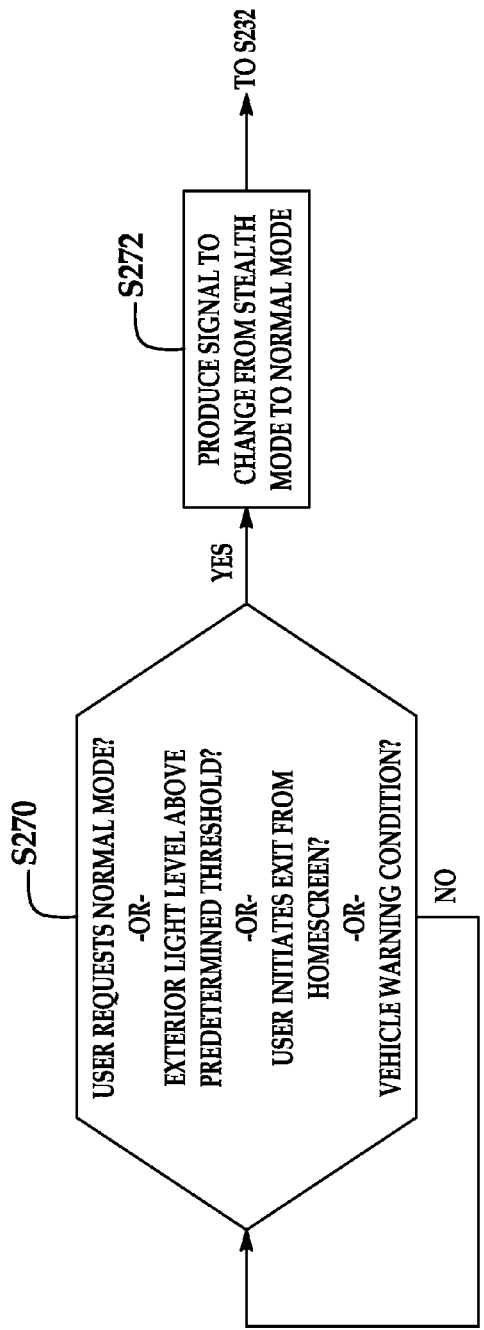

STEALTH MODE FOR INDICIA USED TO DISPLAY VEHICLE OPERATION

TECHNICAL FIELD

The embodiments disclosed herein generally relate to control over the operation of a vehicle dashboard assembly with plurality of illuminable components and an adaptable display.

BACKGROUND

The front passenger compartment of a vehicle typically includes a dashboard forward of the front seats. The dashboard includes an instrument panel having gauges and other indicia indicative of various vehicle operating conditions. Some vehicles are further configured to include one or more displays in the instrument panel in addition to the gauges. A center stack extends beneath the dashboard and can include a variety of user controls, information and entertainment systems, and other features, as non-limiting examples.

Each of the above-described dashboard and center stack components can be optically coupled to a light source so that the components can be illuminated according to preset criteria or according to user preference. As these types of components increase in number and presence throughout the front passenger compartment, consumers of the vehicle may want features that can provide a more focused driving environment or a more emotional connection to the vehicle without sacrificing the convenience offered by a multitude of dashboard and center stack components.

SUMMARY

Disclosed herein are embodiments of a system and method for controlling illumination in a vehicle passenger compartment. In one aspect, a display system for a motor vehicle passenger compartment comprises: at least one indicia visible to an operator of the vehicle and configured to indicate a vehicle operating condition; an indicia light configured to illuminate the indicia; a display device visible to an operator of the vehicle; and a controller, in communication with the indicia light and the display device, programmed to: operate the display system in a first mode wherein the indicia light is activated to illuminate the indicia, and in response to a first control signal indicative of a change from the first mode to a second mode, reduce illumination of the indicia by the indicia light and control the display device to output information indicative of the vehicle operating condition.

In another aspect, a method for controlling a motor vehicle display system that includes at least one indicia configured to indicate a vehicle operating condition and a display device visible to an operator of the vehicle comprises: activating an indicia light configured to illuminate the indicia in a first mode; producing a control signal indicative of a change from the first mode to a second mode; receiving the control signal at a controller; and in response to receiving the control signal at the controller, deactivating the indicia light and outputting, at the display device, information indicative of the vehicle operating condition.

In another aspect, a motor vehicle defining a passenger compartment having a dashboard facing a driver's seat comprises: an instrument panel disposed in the dashboard and housing a display device and at least one gauge configured to indicate a vehicle operating condition; a gauge light configured to illuminate the gauge; and a controller, in communication with the gauge, the gauge light and the display device, programmed to: operate in a first mode wherein the gauge is activated and the gauge light is activated to illuminate the gauge, and in response to a first control signal indicative of a change from the first mode to a second mode, deactivate the gauge and the gauge light and control the display device to output information indicative of the vehicle operating condition.

These and other aspects will be described in additional detail below.

BRIEF DESCRIPTION OF THE DRAWINGS

The various features, advantages and other uses of the present system and method will become more apparent by referring to the following detailed description and drawings in which:

FIG. 9 is a flow diagram showing a subroutine for choosing the stealth mode in the flow diagram of FIG. 7; and FIG. 10 is a flow diagram showing a subroutine for choosing the normal mode in the flow diagram of FIG. 7.

DETAILED DESCRIPTION

Disclosed herein are embodiments of a system and method for controlling the illumination of a vehicle passenger compartment to selectively provide a more focused driving environment or a more emotional connection to the vehicle, for example.

Figure 1:
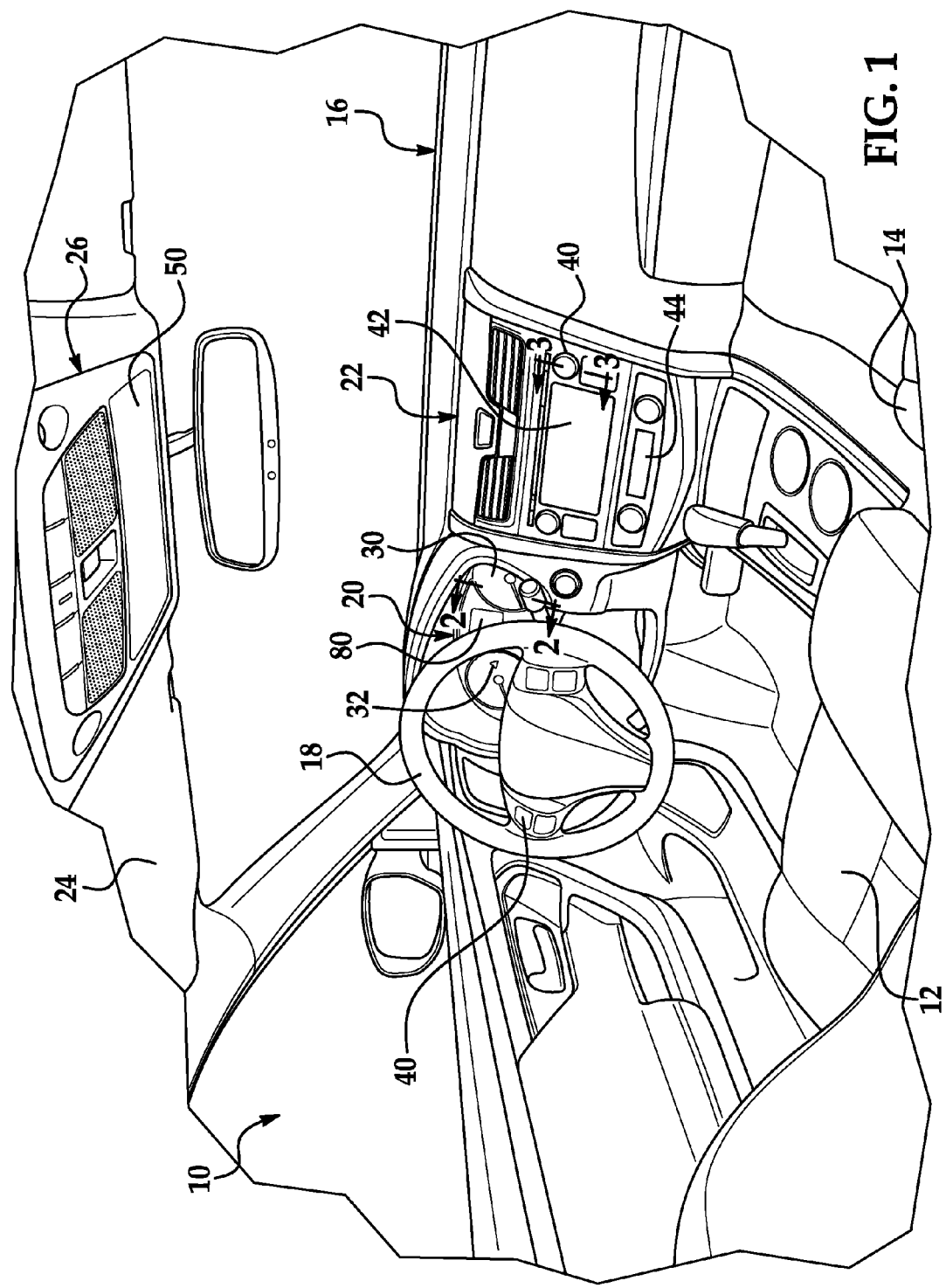
FIG. 1 is a perspective view of a vehicle passenger compartment showing an instrument panel, a center stack and a roof console.

An example of a front passenger compartment 10 of a vehicle interior is shown in FIG. 1. The front passenger compartment 10 includes a front drivers' seat 12 and a front passenger seat 14. A dash 16 extends transversely across the vehicle forward of the vehicle seats 12 and 14 and serves as a forward boundary for the front passenger compartment 10. A steering wheel 18 extends generally rearward from the dash 16 opposite the front drivers' seat 12. The dash 16 includes an instrument panel 20 opposite the front drivers' seat 12 and generally positioned above and forward of the steering wheel 18. A center stack 22 extends downward from the dash 16. The center stack 22 is oriented towards the vehicle seats 12 and 14 and is transversely disposed at a position generally between the front drivers' seat 12 and the front passenger seat 14. A roof 24 extends horizontally in a longitudinal direction of the vehicle and serves as an upper boundary for the front passenger compartment 10. A roof mounted counsel 26 is provided in the roof 24 above the vehicle seats 12 and 14 and is transversely disposed at a position generally between the front drivers' seat 12 and the front passenger seat 14.

The front passenger compartment 10 contains features for presenting one or more vehicle operating conditions to an operator or other user of the vehicle. For example, as shown in FIG. 1, the instrument panel 20 includes a number of indicia indicative of various vehicle operating conditions. In the illustrated instrument panel 20, such indicia can include one or more gauges 30 and one or more indicators 32.

The gauges 30 are housed by the instrument panel 20 and can be configured to indicate vehicle operating conditions. These vehicle operating conditions can include, as non-limiting examples, the rotation speed of an engine powering the vehicle, the speed at which the vehicle is traveling, the fill state of a fuel reservoir or the temperature of an engine coolant. While these are presented as non-limiting examples, it will be understood that many other vehicle operating conditions could be presented by a gauge 30. In the illustrated example, the gauges 30 are shown as mechanically operated analog style gauges. However, the term "gauge" as used herein could also include, for example, a facsimile of such a gauge, a digital display or any other manner for presenting a vehicle operating condition to an operator or other user of the vehicle.

The indicators 32 are positioned on or about the gauges 30 in the instrument panel 20 and are similarly configured to indicate vehicle operating conditions. The indicators 32 can include vehicle warning condition indicators that operate when a vehicle operating condition deviates from a predetermined preferred value or range of values. For example, a vehicle warning condition indicator could be configured to alert an operator or other user of the vehicle that an engine has lost a normal oil pressure, that a tire pressure is low, that a seat belt is not engaged, or that a fill state of a fuel reservoir is low. While these are presented as non-limiting examples, it will be understood that other vehicle warning conditions can be presented by an indicator 32.

In the illustrated example, the indicators 32 are shown as back lit indicators. However, the indicators could also include, for example, a facsimile of such an indicator, a digital display or any other manner for presenting a vehicle operating condition to an operator or other user of the vehicle.

The front passenger compartment 10 additionally includes features for permitting interaction between the vehicle and the operator or other users of the vehicle with respect to one or more vehicle operating conditions. For example, as shown in FIG. 1, the steering wheel 18 and center stack 22 each include a number of user controls 40. The user controls 40 can be operatively coupled to respective operating conditions of the vehicle to permit the operator or other users of the vehicle to control or adjust such vehicle operating conditions. Those vehicle operating conditions that are operatively coupled with a user control 40 are termed hereafter as vehicle operating parameters for ease of understanding. The vehicle operating parameters can relate, for example, to audio, media, navigation and climate control systems, as well as to a variety of driver aids or auxiliary vehicle systems.

The user controls 40 can be "hard" controls or "soft" controls, or a combination of the two. For example, the user controls 40 can be or include a variety of hard controls, such as buttons, switches, knobs, touch sensitive controls and the like. One or more of the user controls 40 could also be a soft control, that is, accessible through a graphical user interface, such as an electronic display 42 (e.g., a touch screen) of an information and entertainment system housed by the center stack 22.

The front passenger compartment 10 can be adapted to present a state of one or more of the vehicle operating parameters. For example, a state of a vehicle operating parameter could be presented by the physical position of a respective hard user control 40 with respect to some reference. A state of one or more vehicle operating parameters could also be presented by an auxiliary electronic display 44 housed by the center stack 22. The indicators 32 could also include vehicle operating parameter state indicators, for example, indicators that are configured to alert an operator or other user of the vehicle that a cruise control is engaged, that a high beam indicator light is activated, or that a turn signal light is activated. These are presented as non-limiting examples, and it will be understood that the states of other vehicle operating parameters can be presented by an indicator 32.

The front passenger compartment 10 can further include features for providing ambient illumination to the front passenger compartment 10. For example, as shown in FIG. 1, the roof mounted console 26 houses an ambient light source 50 directed downward from the roof 24 to illuminate the front passenger compartment 10. The configuration and placement of the ambient light source 50 is presented as a non-limiting example. It will be understood that the ambient light source 50 can be or include a single lighting element or multiple lighting elements, one or more of which could be positioned elsewhere than adjacent the roof 24 to illuminate the front passenger compartment 10. For example, the ambient light source can be positioned along any one or combination of a portion of the dash 16, the center stack 22, a center console, a vehicle pillar, a vehicle door, a door sill, the driver seat 12, the passenger seat 14, the roof 24, and a floor of the vehicle.

Figure 2:
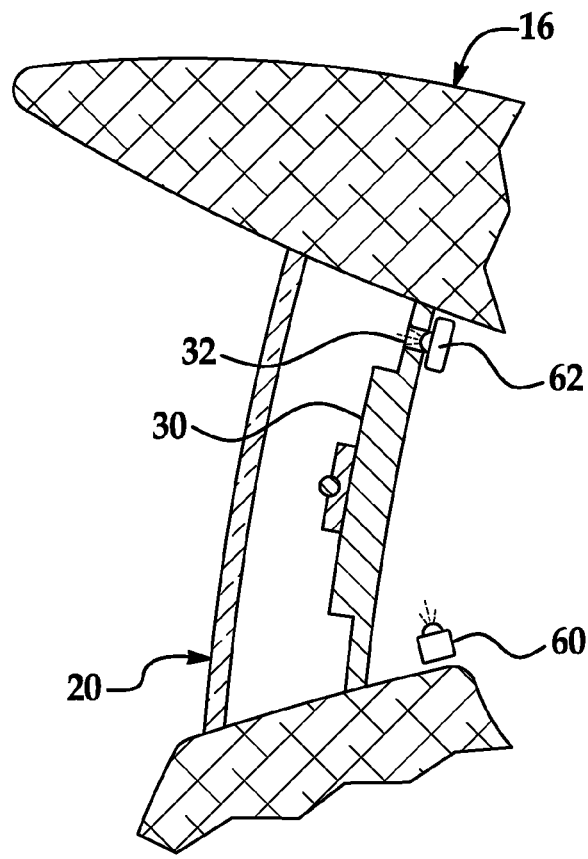
FIG. 2 is a first cross section of the vehicle passenger compartment of FIG. 1 taken along the line 2-2 and showing details of the instrument panel.
Figure 3:
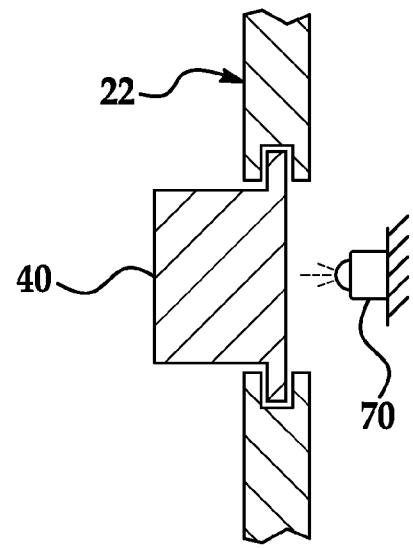
FIG. 3 is a second cross section of the vehicle passenger compartment of FIG. 1 taken along the line 3-3 and showing details of the center stack.

In addition to the ambient light source 50, the front passenger compartment 10 houses other illuminable components, including the above described gauges 30, indicators 32 and user controls 40. Each of the gauges 30, indicators 32 and user controls 40 can be optically coupled to one or more respective light sources. In the illustrated example, the gauges 30 can be backlit by a gauge light source 60, as shown in FIG. 2, and an exemplary user control 40 can be backlit by a user control light source 70, as shown in FIG. 3. Further, as shown in FIG. 3 and as described above, the illustrated indicators 32 can similarly be backlit by an indicator light source 62. For the illustrated indicator 32, the output of the indicator light source 62 can be isolated and directed with respect to a mask formed in or around a gauge 30 in the instrument panel 20 in order to a present a particular vehicle operating condition.

The light sources 60, 62 and 70 are presented as non-limiting examples. The configuration of the gauge light source 60 can vary according to the manner chosen to present a given vehicle operating condition to an operator or other user of the vehicle. For example, a gauge light source 60 could be positioned in front of a front lit gauge 30, or could be generally integral to a gauge 30 facsimile or an electronically displayed gauge 30. Similarly, an indicator light source 62 could be positioned in front of a front lit indicator 32, or could be generally integral to an indicator 32 facsimile or an electronically displayed indicator 32. The configuration of the user control light source 70 can likewise vary according to the manner chosen to permit the operator or other users of the vehicle to control or adjust a given vehicle operating parameter. For example, a user control light source 70 could be positioned in front of a front lit user control 40, or could be generally integral to a touch sensitive user control 40 or a soft user control 40.

Figure 4:
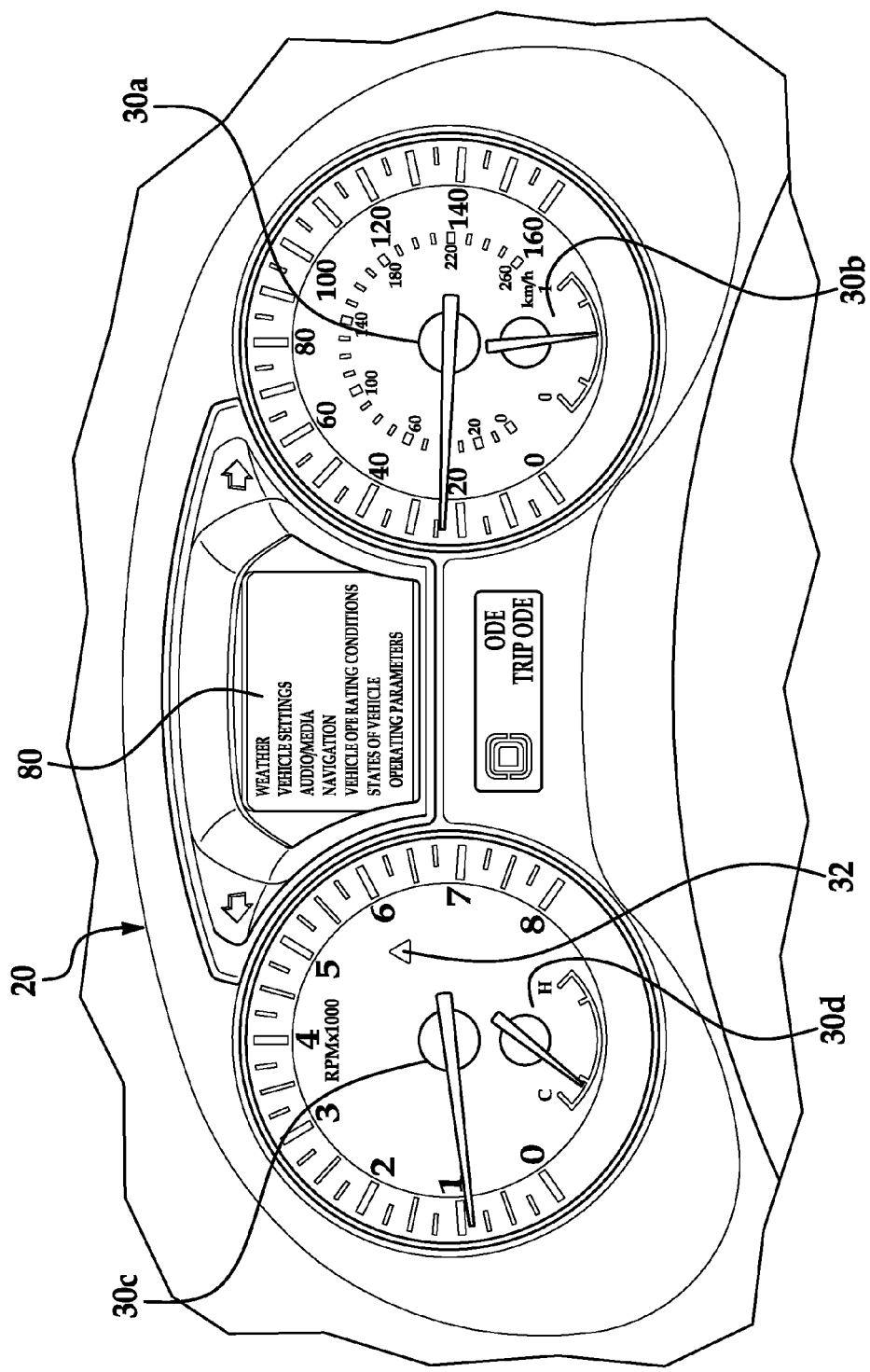
FIG. 4 is a plan view of the instrument panel of FIG. 1 showing an instrument panel mounted display.

In addition to the above described components, the front passenger compartment 10 includes an adaptable display 80 housed by the instrument panel 20 adjacent to a plurality of the gauges 30, as shown in FIG. 4. Each of the plurality of gauges 30 is configured to present a vehicle operating condition. As described above, the gauges 30 can include a speedometer gauge 30a that indicates the speed at which the vehicle is traveling, a fuel gauge 30b that indicates the fill state of a fuel reservoir, a tachometer gauge 30c that indicates the rotation speed of an engine powering the vehicle, and a temperature gauge 30d that indicates the temperature of an engine coolant. Again, while these are presented as non-limiting examples, it will be understood that many other vehicle operating conditions in addition to or alternative to those shown and described can be presented by a gauge 30.

The illustrated display 80 can be an electronic display that is generally adaptable to display information to an operator of the vehicle. This information can be any information pertaining to the vehicle itself or any other information relevant to the operator. For example, the display can display information relating to the weather, to various vehicle settings, to audio and/or media information or to navigation functions.

The display 80 is also adaptable to display one or more of the vehicle operating conditions presented by the gauges 30 and/or indicators 32. In addition, the display 80 can be further adaptable to display the states of one or more of the vehicle operating parameters that are controlled by the user controls 40. It will be understood that the display 80 can display the vehicle operating conditions and states of the vehicle operating parameters in the same or a different manner than the respective gauges 30, indicators 32, user controls 40, electronic display 42 or auxiliary electronic display 44.

Although the display 80 is shown as a singular display 80, the display 80 could be embodied in multiple discrete displays, for example. Further, the physical layout of the display 80 with respect to the gauges 30 and indicators 32 within the instrument panel 20 can vary according to the manner chosen to present the vehicle operating conditions to an operator or other user of the vehicle. For example, if the gauges 30 and indicators 32 are also electronically displayed in the instrument panel 20, the display 80 could be a subset of a larger electronic display including one or more gauges 30 and indicators 32. Further, although display 80 is shown housed by the instrument panel 20 adjacent to the plurality of gauges 30, the display 80 could be positioned otherwise in the front passenger compartment 10 as long as the display 80 remains visible and readable by an operator of the vehicle. As one non-limiting example, the display 80 could be embodied in one or more so-called heads-up displays.

Figure 5:
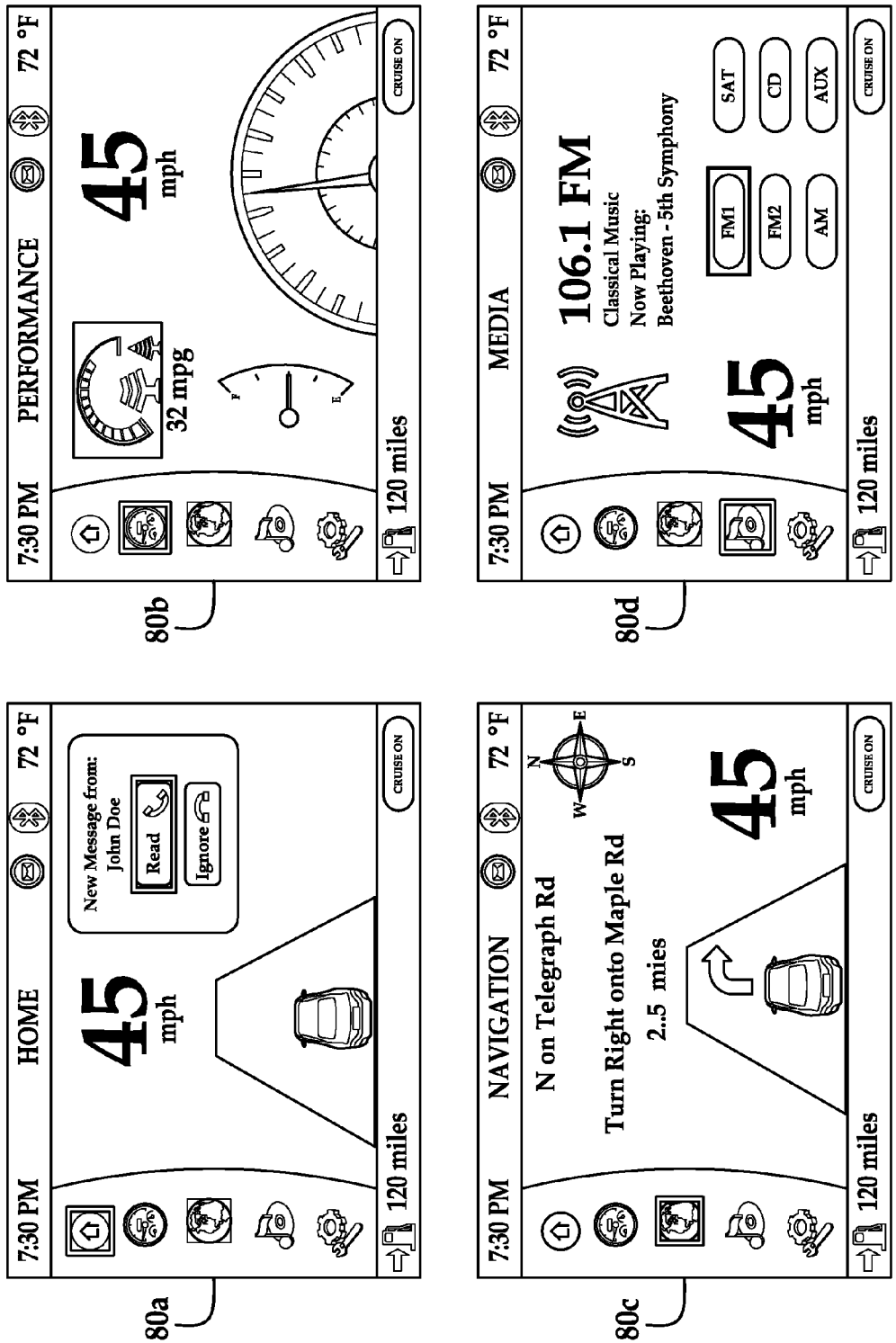
FIG. 5 includes plan views showing example display configurations for the display of FIG. 4.

Examples of exemplary configurations for the display 80 are shown in FIG. 5. This disclosure contemplates that certain information regarding the vehicle operating conditions and/or the states of vehicle operating parameters is preferably presented to an operator of the vehicle during operation of the vehicle. The information to be presented could be chosen according to legal or other regulatory requirements, general consumer demand, specific operator preference or a combination thereof, for instance.

The display 80 is adaptable such that at least this information is presented by the display 80 when the display 80 is controlled according to a home screen 80a. As a non-limiting and illustrative example, it may be determined that the information that should be presented during operation of the vehicle includes the speed at which the vehicle is traveling, the fill state of a fuel reservoir, and, if active, information concerning a state of a cruise control system and information concerning navigation functions. It will be understood that the illustrated home screen 80a is merely representative of a screen that displays information that is preferably presented to an operator of vehicle during operation of the vehicle. Accordingly, any screen configuration that displays this information, regardless of any other information presented, can be termed a "home screen" as described herein.

It can be seen from this example and the above description that the home screen 80a information can be fully or partially redundant of information otherwise presented in the front passenger compartment 10 by one or more of the gauges 30, indicators 32 or user controls 40, by the electronic display 42 of an information and entertainment system, or by the auxiliary electronic display 44.

When these components are otherwise operational, the display 80 can still optionally be controlled according to the home screen 80a. However, to the extent that the home screen 80a information is redundant of information presented elsewhere in the front passenger compartment 10, the display 80 can be controlled according to any other criteria or preferences. As shown in FIG. 5, other non-limiting possibilities for the display 80 include a performance screen 80b, where the display 80 is adapted to display information relating to performance metrics for the vehicle, a navigation screen 80c, where the display 80 is adapted to display information relating to navigation functions, and a media screen 80d, where the display 80 is adapted to display information relating to audio and/or media information. It will be understood that the information presented by the respective screens 80a-80d need not be mutually exclusive and that each of the screens 80b-80d optionally may or may not present some, none or all of the home screen 80a information.

Figure 6:
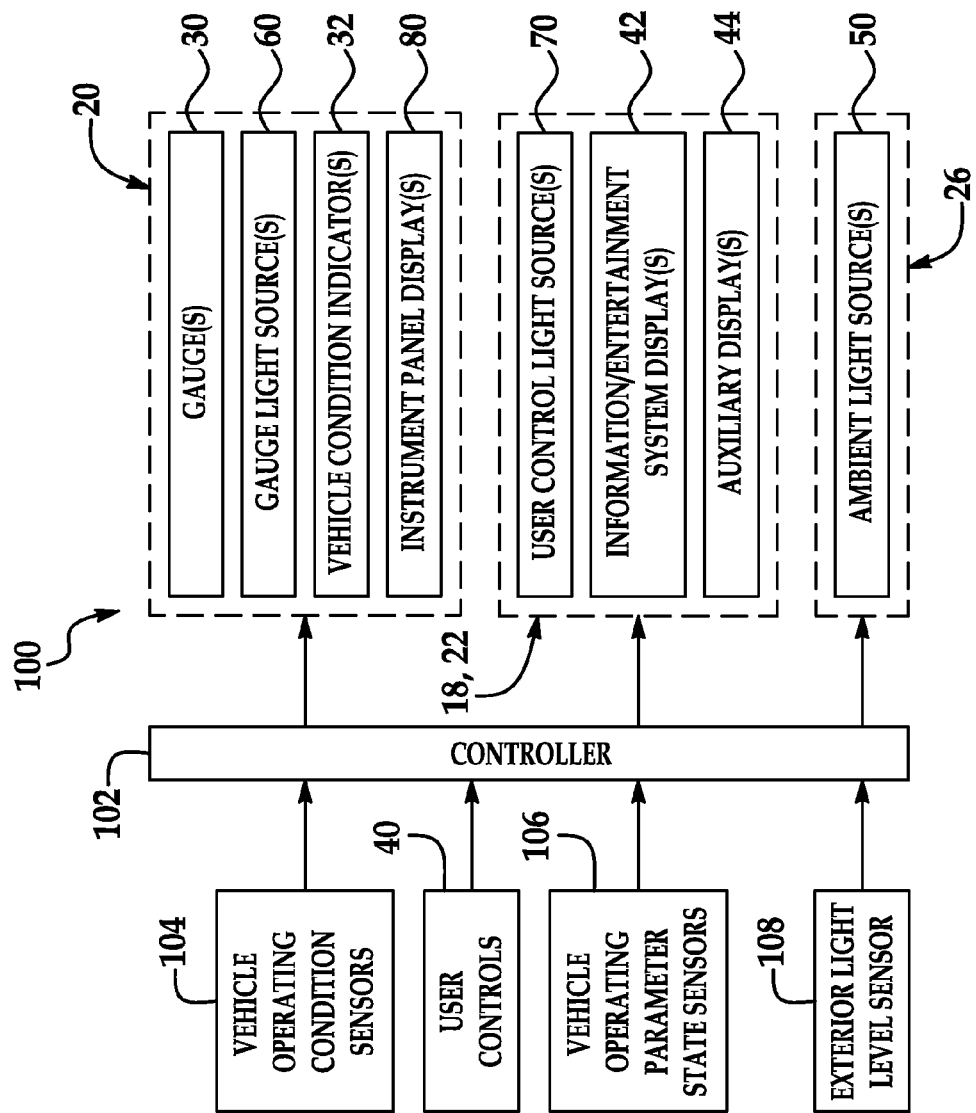
FIG. 6 is a block diagram showing a control system for illumination of the vehicle passenger compartment of FIG. 1.

As shown in FIG. 6, the above described components of the front passenger compartment 10 can be individually and collectively controlled as a part of a display system 100 for the front passenger compartment 10.

The logic for controlling the display system 100 is embodied in a controller 102. The controller 102 generally receives input signals originating from sensors 104 that detect or estimate the various vehicle operating conditions, signals originating from sensors 106 that detect or estimate the states of the various vehicle operating parameters, and a signal originating from an exterior light level sensor 108 that that detects or estimates a light level exterior to the vehicle.

The controller 102 can be directly or indirectly communicatively coupled to the above described components of the front passenger compartment 10. As shown, the controller 102 is generally configured to control operation of the gauges 30, the illumination of the gauges 30 through control of respective gauge light sources 60, the vehicle condition indicators 32 and the display 80 of the instrument panel 20. The controller 102 is similarly configured to control the illumination of the user controls 40 through control of respective user control light sources 70, the electronic display 42 of an information and entertainment system and the auxiliary electronic display 44 of the center stack 22. The controller 102 is additionally configured to control ambient illumination of the front passenger compartment 10 through control of one or more ambient light sources 50.

The controller 102 could be one or multiple microcomputers including a random access memory (RAM), a read-only memory (ROM) and a central processing unit (CPU) in addition to various input and output connections. Generally, the control functions described herein can be implemented by one or more software programs stored in internal or external memory and are performed by execution by the CPU. However, some or all of the functions could also be implemented by hardware components.

The display system 100 can be operated on a selective basis to generally reduce the spread of information throughout the front passenger compartment 10 that is presented to an operator or other user of the vehicle. Although this operation can be particularly advantageous at night or when an exterior light level is otherwise low, such operation of the display system 100 is not limited to these situations.

Figure 7:
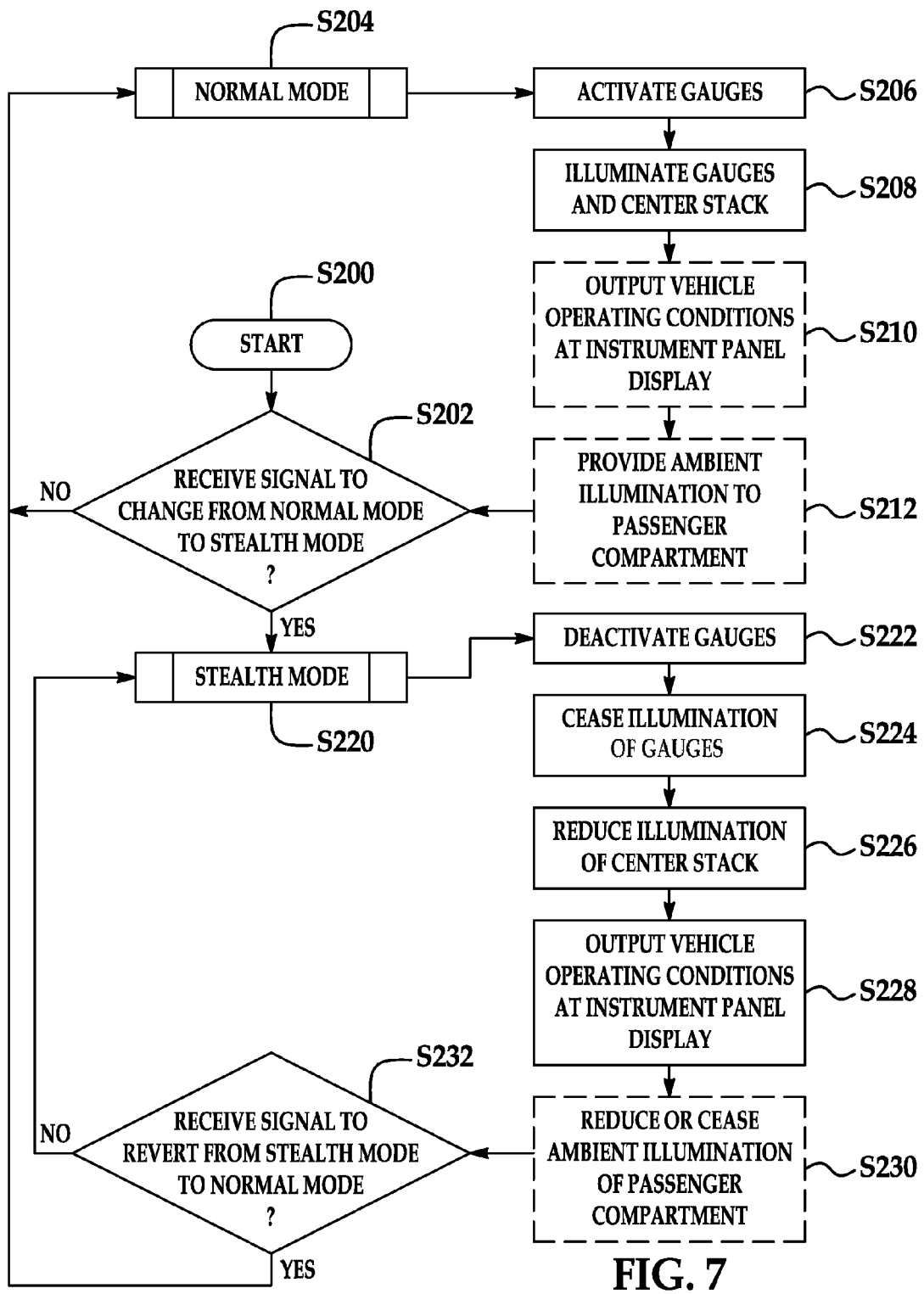
FIG. 7 is a flow diagram of a mode change between a normal mode and a stealth mode for the control system of FIG. 6.

As shown in FIG. 7, the display system 100 is generally configured to operate in one of a normal mode and a stealth mode. In step S200, the logic of the display system 100 is initiated. In step S202, it is determined whether a signal has been received to change from the normal mode to the stealth mode. If the signal to change from the normal mode to the stealth mode is not received, the display system 100 is operated according to the normal mode at step 204.

In the normal mode, each of the one or more gauges 30 of the instrument panel 20 are activated at step S206 so as to be operational and indicate a respective vehicle operating condition. At step S208, the gauge light sources 60 are activated so as to illuminate the gauges 30 in the instrument panel 20, and the user control light sources 70 are activated so as to illuminate the user controls 40 of the center stack 22. If needed, the indicia light sources 62 are also activated in the normal mode so as to selectively illuminate indicators 32 in the instrument panel 20 in accordance with the current vehicle conditions. In addition, the electronic display 42 of an information and entertainment system, the auxiliary electronic display 44 and any other illuminable components of the center stack 22 can be controlled to fully illuminate in step S208. It will be understood that the level of illumination of the various illuminable components described herein may vary in the normal mode according to, for example, vehicle presets and/or user preferences. That is, "full" illumination in the normal mode need not correspond to the greatest amount of operational illumination. Rater, full illumination in the normal mode is the amount of illumination that is selected for those components during normal vehicle operation. With the gauges 30 activated and illuminated, and with the center stack fully 22 illuminated, any available information regarding vehicle operating conditions and/or the states of vehicle operating parameters can be presented to an operator or other users of the vehicle by the display system 100 in the normal mode.

In the normal mode, the home screen 80a information can be fully or partially redundant of information otherwise presented by the display system 100. In step S210, the display 80 can still optionally be controlled according to the home screen 80a, or according to some variation of the home screen 80a. However, to the extent that the home screen 80a information is redundant of information presented elsewhere in the front passenger compartment 10, the display 80 can optionally be controlled according to any other preset criteria, operator preference, or both, for example, or could be deactivated.

Finally, at step S212, any ambient light sources 50 can optionally be activated so as to illuminate the front passenger compartment 10 to a full ambient light level.

The controller 102 can determine whether the normal mode or the stealth mode is chosen at certain intervals. When a last previous determination and a current determination are the same, the current mode is maintained. When the current determination is different from the last previous determination, then the controller carries out control to switch from the current mode. Following step S212, it is again determined whether a signal has been received to change from the normal mode to the stealth mode at step S202. If the signal to change from the normal mode to the stealth mode is not received, the display system 100 continues to operate according to the normal mode at step S204. However, if the signal to change from the normal mode to the stealth mode is received at step S202, the stealth mode is selected at step S220.

In the stealth mode, each of the one or more gauges 30 of the instrument panel 20 are deactivated at step S222 so as to be non-operational and no longer indicate a respective vehicle operating condition. At step S224, the gauge light sources 60 are deactivated so that illumination of the gauges 30 in the instrument panel 20 ceases.

At step S226, the illumination of the user controls 40 of the center stack 22 is reduced as compared to the illumination of the user controls 40 in the normal mode. As used herein, the term "reduce" and its derivatives refer to any reduction in illumination as compared to the normal mode, including cessation of illumination. Thus, the user control light sources 70 can be dimmed, for example, or can be completely deactivated, so as to cease illumination of the user controls 40. In addition, the electronic display 42 of an information and entertainment system, the auxiliary electronic display 44 and any other illuminable components of the center stack 22 are similarly controlled to be less than fully illuminated.

For the illustrated analog style gauges 30, it is preferable to deactivate the gauges 30 at step S222 in addition to ceasing illumination at step S224. This is done to prevent confusion as to whether the gauge light sources 60 are broken, which could occur if the gauges 30 remained operational while not being illuminated. However, it will be understood that it may not be necessary to separately deactivate and cease illumination of a gauge 30. For example, if a gauge 30 facsimile or an electronically displayed gauge 30 is implemented, deactivation of the gauge 30 could also result in cessation of illumination of the gauge 30.

With the gauges 30 deactivated and not illuminated, and with the illuminable components of the center stack 22 controlled to be less than fully illuminated, much of the information regarding vehicle operating conditions and/or the states of vehicle operating parameters presented by the display system 100 in the normal mode are no longer presented or are presented without full illumination. Therefore, in the stealth mode, at step S228 the display 80 is controlled according to the home screen 80a to ensure that all desired information is presented at the instrument panel 20. As explained above, the home screen 80a is merely representative of a screen that displays the home screen 80a information. The specific configuration of the display 80 in the stealth mode could be the same or similar to a home screen 80a configuration in the normal mode, or, for example, the display 80 could be configured according to a home screen 80a that is specific to the stealth mode.

At step S230, any ambient light sources 50 can optionally be dimmed, for example, or can be completely deactivated so as to less than fully illuminate the front passenger compartment 10.

Figure 8:
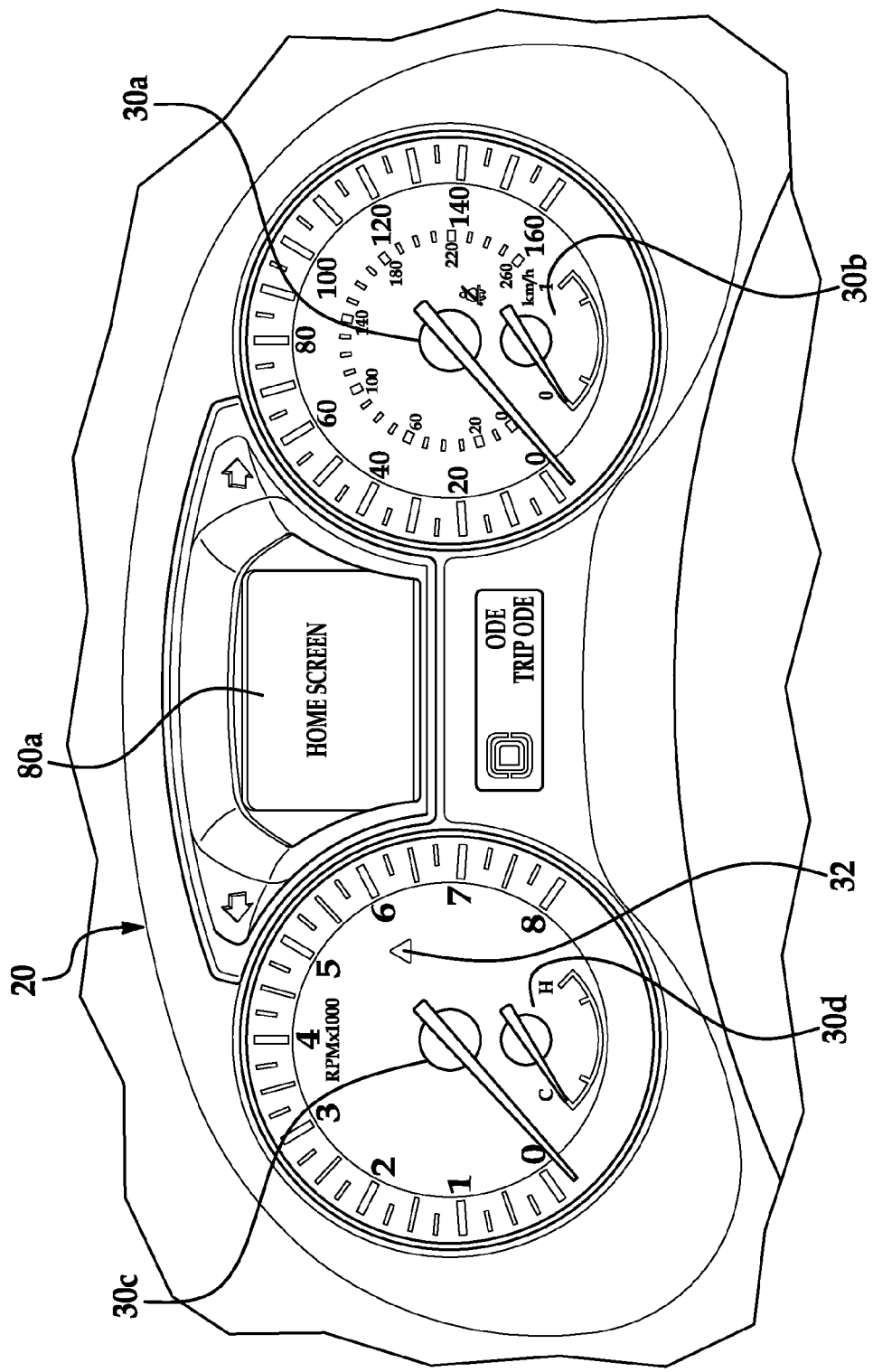
FIG. 8 is a plan view of the instrument panel of FIG. 1 showing the instrument panel operated according to the stealth mode.

It can be seen that the effect of a switch from the normal mode to the stealth mode is a general consolidation of the information presented by the display system 100 to an operator or other user of the vehicle. As shown in FIG. 8, each of the gauges 30 are deactivated and not illuminated, and the display 80 is controlled according to the home screen 80a. In the stealth mode, all desired information can be presented by the display 80 in the instrument panel 20, resulting in a more focused driving environment in the front passenger compartment 10. If there is a full or partial redundancy between the information presented by the display 80 in the stealth mode and the information presented elsewhere in the front passenger compartment 10 during the normal mode, a switch from the normal mode to the stealth mode can eliminate the redundancy, as well as selectively reduce the presentation of undesired information. On the other hand, if there is no redundancy between the information presented by the display 80 in the stealth mode and the information presented elsewhere in the front passenger compartment 10 during the normal mode, a switch from the normal mode to the stealth mode results in a full consolidation of all desired information at the display 80 in addition to the reduction in the presentation of undesired information.

Following step S230, it is determined whether a signal has been received to change from the stealth mode to the normal mode at step S232. If the signal to change from the stealth mode to the normal mode is not received, the display system 100 continues to operate according to the stealth mode at step S220. However, if the signal to change from the stealth mode to the normal mode is received at step S232, the normal mode is selected at step S202. The determination of whether to switch from the normal mode to the stealth mode at step S202 is illustrated in FIG. 9.

In step S250, any number of criteria may be evaluated to determine whether to switch from the normal mode to the stealth mode. For example, it can be determined whether an operator or other user of the vehicle has requested a switch from the normal mode to the stealth mode. Such a request could be accomplished through operation of a user control 40, for example. It is contemplated that this request could be overridden by the display system 100 in certain instances. As noted above, in the normal mode, the display 80 can optionally be controlled according to the home screen 80a. As a non-limiting example, it may be determined that a switch from the normal mode to the stealth mode should not be executed unless the display 100 is controlled according to the home screen 80a in the normal mode, such that a configuration of the display 80 during a switch from the normal mode to the stealth mode generally does not change, or such that any change in configuration is minimized. Thus, the after a switch from the normal mode to the stealth in this example, the gauges 30 are deactivated and not illuminated, the illuminable components of the center stack 22 are controlled to be less than fully illuminated, any ambient light sources 50 are optionally dimmed, and the display 80 remains controlled according to the home screen 80a.

In instances where it is advantageous to employ the stealth mode in low light conditions, it could also be determined in step S250 whether an exterior light level, as determined by the exterior light level sensor 108, has fallen below a predetermined threshold. The predetermined threshold could be, for example, a threshold indicative of nighttime conditions.

These criteria are presented as non-limiting examples, and it will be understood that other criteria could be substituted or used in addition to those described in the determination of whether to switch from the normal mode to the stealth mode. If any of the criteria set forth in step S250 are satisfied, a signal is produced to change from the normal mode to the stealth mode at step S252. The signal is read by the controller 102 at step S202 in FIG. 7 and the display system 100 is controlled to operate according to the stealth mode.

The determination of whether to switch from the stealth mode to the normal mode at step S232 is illustrated in FIG. 10. In step S270, any number of criteria may be evaluated to determine whether to switch from the stealth mode to the normal mode. For example, it can be determined whether an operator or other user of the vehicle has requested a switch from the stealth mode to the normal mode. Such a request could be accomplished through operation of a user control 40, for example. The request could be made directly through operation of a user control 40 that is operatively coupled to a selection of the normal mode and/or stealth mode, for example, but could additionally be determined to arise generally through operation any of the user controls 40. It could also be determined in step S270 whether an exterior light level, as determined by the exterior light level sensor 108, has risen above a predetermined threshold. The predetermined threshold could be, for example, a threshold indicative of daytime conditions.

A switch from the stealth mode to the normal mode could also be appropriate in certain instances where an operator or other user of the vehicle initiates an exit from the home screen 80a. For example, because the each of the gauges 30 are deactivated and not illuminated in the stealth mode, an exit from the home screen 80a could result in a situation where desired or required information is no longer presented in the front passenger compartment 10. In this instance, a switch to the normal mode, where the gauges 30 are activated and illuminated, and where the center stack 22 is fully illuminated, would be desirable. A switch from the stealth mode to the normal mode could further be appropriate in instances where a vehicle warning condition indicator 32 is operated in order to bring the warning condition to the attention of the operator of the vehicle.

The criteria set forth in step S270 are presented as non-limiting examples, and it will be understood that other criteria could be substituted or used in addition to those described in the determination of whether to switch from the stealth mode to the normal mode. If any of the criteria set forth in step S270 are satisfied, a signal is produced to change from the stealth mode to the normal mode at step S272. The signal is read by the controller 102 at step S232 in FIG. 7 and the display system 100 is controlled to operate according to the normal mode.

A full switch from the stealth mode to the normal mode could be implemented in step S270, that is, the normal mode could be selected until a determination is made to switch from the normal mode to the stealth mode in step S250. Alternatively, the normal mode could be chosen for a temporary period of time, after which the display system 100 is again controlled to operate according to the stealth mode. For instance, the normal mode could be chosen for a period of time while a vehicle warning condition indicator 32 is operated, and the display system 100 could be again controlled to operate according to the stealth mode when the particular vehicle warning condition ceases and the vehicle warning condition indicator 32 is no longer operated. As a further example, where it is determined that an operator or other user of the vehicle has requested a switch from the stealth mode to the normal mode through operation of a user control 40, the display system 100 could be again controlled to operate according to the stealth mode after a predetermined period of time.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A display system for a motor vehicle passenger compartment, comprising:
    at least one indicia visible to an operator of the vehicle and configured to indicate a vehicle operating condition;
    an indicia light configured to illuminate the indicia;
    a display device visible to an operator of the vehicle; and a controller, in communication with the indicia light and the display device, programmed to:
operate the display system in a first mode wherein the indicia light is activated to illuminate the indicia, and
in response to a first control signal indicative of a change from the first mode to a second mode, reduce illumination of the indicia by the indicia light and control the display device to output information indicative of the vehicle operating condition.

2. The display system of claim 1, wherein the controller is programmed to:
in response to the first control signal, deactivate the indicia light and deactivate the indicia.

3. The display of claim 1, further comprising:
an operator control configured to control a vehicle operating parameter; and
an operator control light configured to illuminate the operator control, wherein the controller is programmed to:
in response to the first control signal, reduce illumination of the operator control by the operator control light.

4. The display system of claim 3, wherein the controller is programmed to:
in response to the first control signal, control the display device to output information indicative of the vehicle operating parameter.

5. The display system of claim 3, wherein the controller is programmed to:
in response to the first control signal, deactivate the operator control light.

6. The display system of claim 1, further comprising:
an ambient light configured to illuminate the vehicle passenger compartment, wherein the controller is programmed to:
activate the ambient light to illuminate the vehicle passenger compartment at a first level while operating the display system in the first mode, and
in response to the first control signal, reduce illumination of the vehicle passenger compartment by the ambient light to a second level lower than the first level.

7. The display system of claim 1, further comprising:
a sensor configured to detect an exterior light level, wherein the first control signal is generated when the exterior light level detected by the sensor falls below a predetermined level.

8. The display system of claim 1, further comprising:
an operator control, wherein the first control signal is generated upon operation of the operator control.

9. The display system of claim 1, wherein the controller is programmed to:
in response to the first control signal, deactivate the indicia light and deactivate the indicia; and
in response to a second control signal indicative of a change from the second mode to the first mode, activate the indicia light and activate the indicia.

10. The display system of claim 9, wherein the second control signal is generated when a vehicle warning condition arises.

11. The display system of claim 1, wherein the controller is programmed to:
control the display device to output information indicative of the vehicle operating condition when operating the display system in the first mode.

12. The display system of claim 1, wherein the controller is programmed to:
control the display device not to output information indicative of the vehicle operating condition when operating the display system in the first mode.

13. The display system of claim 1, wherein the controller is programmed to:
deactivate the display device when operating the display system in the first mode.

14. The display system of claim 1, further comprising:
a plurality of indicia visible to an operator of the vehicle and each configured to indicate a respective vehicle operating condition;
one or more indicia lights configured to illuminate the plurality of indicia;
wherein the controller, in communication with the plurality of indicia and the one or more indicia lights, is programmed to:
activate each of the plurality of indicia and activate the one or more indicia lights to illuminate each of the plurality of indicia when operating the display system in the first mode, and
in response to the first control signal, deactivate each of the plurality of indicia and the one or more indicia lights and control the display device to output information indicative of at least one vehicle operating condition indicated by the plurality of indicia.

15. The display system of claim 1, wherein the vehicle operating condition is selected from the group consisting of a rotation speed of an engine, a speed of the motor vehicle, a fill state of a fuel tank and a temperature of an engine coolant.

16. A method for controlling a motor vehicle display system that includes at least one indicia configured to indicate a vehicle operating condition and a display device visible to an operator of the vehicle, the method comprising:
activating an indicia light configured to illuminate the indicia in a first mode;
producing a control signal indicative of a change from the first mode to a second mode;
receiving the control signal at a controller; and
in response to receiving the control signal at the controller, deactivating the indicia light and outputting, at the display device, information indicative of the vehicle operating condition.

17. A motor vehicle defining a passenger compartment having a dashboard facing a driver's seat, comprising:
an instrument panel disposed in the dashboard and housing a display device and at least one gauge configured to indicate a vehicle operating condition;
a gauge light configured to illuminate the gauge; and
a controller, in communication with the gauge, the gauge light and the display device, programmed to:
operate in a first mode wherein the gauge is activated and the gauge light is activated to illuminate the gauge, and
in response to a first control signal indicative of a change from the first mode to a second mode, deactivate the gauge and the gauge light and control the display device to output information indicative of the vehicle operating condition.

18. The motor vehicle of claim 17, further comprising:
a center stack extending from the dashboard and including an operator control configured to control a vehicle operating parameter; and
an operator control light configured to illuminate the operator control, wherein the controller is programmed to:

in response to the control signal, reduce illumination of the operator control by the operator control light.

19. The motor vehicle of claim 17, further comprising:
an ambient light configured to illuminate the vehicle passenger compartment, wherein the controller is programmed to:
activate the ambient light to illuminate the vehicle passenger compartment at a first level while operating the display system in the first mode, and
in response to the control signal, reduce illumination of the vehicle passenger compartment by the ambient light to a second level lower than the first level.

20. The motor vehicle of claim 17, wherein the vehicle operating condition is selected from the group consisting of a rotation speed of an engine, a speed of the motor vehicle, a fill state of a fuel tank and a temperature of an engine coolant.

\* \* \* \* \*